United States Patent
Yamashita et al.

(10) Patent No.: US 6,859,898 B1
(45) Date of Patent: Feb. 22, 2005

(54) MONITOR APPARATUS FOR SEQUENTIAL-FUNCTION-CHART-TYPE PROGRAMMABLE CONTROLLER

(75) Inventors: Tsuyoshi Yamashita, Nagoya (JP); Masaharu Fujisaki, Nisio (JP); Hidetoshi Kato, Kariya (JP); Hiroyuki Takahara, Chiryu (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 469 days.

(21) Appl. No.: 09/665,588

(22) Filed: Sep. 19, 2000

(30) Foreign Application Priority Data

Sep. 30, 1999 (JP) ............................................ 11-280482

(51) Int. Cl.$^7$ ................................................. G06F 11/00
(52) U.S. Cl. ............................. 714/55; 714/38; 714/51; 717/125; 700/26
(58) Field of Search ............................. 714/38, 51, 55, 714/39, 15, 34, 736; 717/125, 128, 132, 133; 700/26, 27; 711/152; 713/300; 712/216

(56) References Cited

U.S. PATENT DOCUMENTS

| | | | | |
|---|---|---|---|---|
| 3,908,117 A | * | 9/1975 | Naruse et al. | ................. 714/55 |
| 4,535,456 A | * | 8/1985 | Bauer et al. | .................. 714/31 |
| 5,097,470 A | * | 3/1992 | Gihl | ............................ 714/55 |
| 5,410,469 A | | 4/1995 | Sakamoto et al. | |
| 5,426,730 A | * | 6/1995 | Miyake et al. | ............... 345/839 |
| 5,485,620 A | * | 1/1996 | Sadre et al. | ................. 717/162 |
| 5,687,074 A | * | 11/1997 | Tanaka et al. | ................. 700/26 |
| 5,764,971 A | * | 6/1998 | Shang et al. | ................. 712/244 |
| 5,784,621 A | * | 7/1998 | Onishi et al. | ................ 717/109 |
| 5,793,947 A | * | 8/1998 | Sakamoto | ..................... 714/45 |
| 5,926,176 A | * | 7/1999 | McMillan et al. | ........... 345/764 |
| 5,995,916 A | * | 11/1999 | Nixon et al. | ................. 702/182 |
| 6,141,628 A | * | 10/2000 | Worth et al. | ................. 702/185 |
| 6,282,701 B1 | * | 8/2001 | Wygodny et al. | ............ 717/125 |

FOREIGN PATENT DOCUMENTS

| | | |
|---|---|---|
| EP | 0 389 990 | 10/1990 |
| EP | 0 618 517 | 10/1994 |
| JP | 5-313709 | 11/1993 |
| JP | 11-167409 | 6/1999 |

* cited by examiner

*Primary Examiner*—Robert Beausoliel
*Assistant Examiner*—Michael Maskulinski
(74) *Attorney, Agent, or Firm*—Oblon, Spivak, McClelland, Maier & Neustadt, P.C.

(57) ABSTRACT

In a monitor apparatus for a sequential-function-chart-type programmable controller, a standard value of an active time of an arbitrary step in a sequential-function-chart program is stored, and the active time of the arbitrary step is measured during execution of the program. An anomalous state of the arbitrary step is detected through comparison between the measured active time and the reference value. Further, data indicating whether each step in the sequential-function-chart program has been executed are stored. The program is displayed such a manner that an anomalous step, a step or steps which have been executed, and a step or steps which have not yet been executed are distinguished from one another.

4 Claims, 12 Drawing Sheets

FIG. 5

| STEP | ACTIVE FLAG |
|---|---|
| INITIAL STEP | 0 |
| STEP 1 | 0 |
| STEP 2 | 0 |
| STEP 3 | 0 |
| STEP 4 | 0 |
| STEP 5 | 0 |
| STEP 6 | 1 |
| ⋮ | |

| STEP | MONITOR FLAG |
|---|---|
| INITIAL STEP | 0 |
| STEP 1 | 0 |
| STEP 2 | 0 |
| STEP 3 | 1 |
| STEP 4 | 1 |
| STEP 5 | 1 |
| STEP 6 | 1 |
| ⋮ | |

| STEP | REFERENCE ACTIVE TIME |
|---|---|
| INITIAL STEP | |
| STEP 1 | |
| STEP 2 | |
| STEP 3 | 10.0 |
| STEP 4 | 10.0 |
| STEP 5 | 10.0 |
| STEP 6 | 5.0 |
| ⋮ | |

| STEP | ANOMALOUS-STATE FLAG |
|---|---|
| INITIAL STEP | 0 |
| STEP 1 | 0 |
| STEP 2 | 0 |
| STEP 3 | 0 |
| STEP 4 | 0 |
| STEP 5 | 0 |
| STEP 6 | 1 |
| ⋮ | |

| STEP | EXECUTION-COMPLETION FLAG |
|---|---|
| INITIAL STEP | 1 |
| STEP 1 | 1 |
| STEP 2 | 1 |
| STEP 3 | 0 |
| STEP 4 | 1 |
| STEP 5 | 0 |
| STEP 6 | 0 |
| ⋮ | |

| STEP | ACTIVE FLAG | EXECUTION-COMPLETION FLAG | ANOMALOUS-STATE FLAG |
|---|---|---|---|
| INITIAL STEP | 0 | 1 | 0 |
| STEP 1 | 0 | 1 | 0 |
| STEP 2 | 0 | 1 | 0 |
| STEP 3 | 0 | 0 | 0 |
| STEP 4 | 0 | 1 | 0 |
| STEP 5 | 0 | 0 | 0 |
| STEP 6 | 1 | 0 | 1 |
| ⋮ | | | |

MONITOR APPARATUS FOR SEQUENTIAL-FUNCTION-CHART-TYPE PROGRAMMABLE CONTROLLER

BACKGROUND OF THE INVENTION

1. Field of the Invention

The present invention relates to a monitor apparatus for a programmable controller (hereinafter referred to as a "PLC"), and more particularly to a monitor apparatus which is used with a sequential-function-chart (hereinafter referred to as an "SFC")-type PLC and which can detect an anomalous state and monitor an operation history.

2. Description of the Related Art

SFC is a standard programming language for PLCS and is defined in Draft IEC 1131-1 of IEC (International Electrotechnical Commission). SFC programs have been utilized in place of conventional ladder programs, because of easiness of preparing software in modules and short execution time required for executing the entire program in each scan cycle. The decrease in execution time is achieved through selective execution of activated steps. In an SFC program, steps and transitions are connected as in a flowchart. Each step represents an operation or processing module, whereas each transition represents conditions that must be satisfied for a transition from a preceding step to the next step. An operation program is provided for each step, and a transition-condition program is provided for each transition. Each step can assume two states; i.e., an active state and a non-active state. A step is in the active state when a corresponding execution program is operating. When the conditions for a transition succeeding a certain step are satisfied, the certain step becomes non-active, and the next step becomes active.

When a facility controlled by use of a PLC programmed with such an SFC program is stopped due to, for example, occurrence of a failure, a step which is in an active state at the time of stoppage is searched in order to seek a cause of the stoppage.

A plurality of programs prepared by means of SFC can be executed in parallel, and therefore, a large number of SFC programs are executed in parallel in control performed for a modern facility having sophisticated functions. When a failure occurs in such a facility, each of the programs executed in parallel includes a step which is active at the time of occurrence of the failure, and therefore, a huge amount of time and labor is needed to specify a step which causes the stoppage among a large number of active steps.

Meanwhile, a selective branch can be programmed in each SFC program. In the case of a program including a selective branch, the cause of the stoppage cannot be found through mere searching of an active step. Therefore, in some cases, it is demanded to find an control history before execution of the active step. However, under a conventional technique, it is impossible to know a branched path and a step or steps through which the control has reached the step which is active at present.

SUMMARY OF THE INVENTION

In view of the foregoing, an object of the present invention is to provide a monitor apparatus for an SFC-type PLC which solves the above-described problems and which enables quick determination of a step which is a cause of stoppage of a facility.

Another object of the present invention is to provide a monitor apparatus for an SFC-type PLC which can cope with a program including selective branches and which easily finds a route through which control has reached a presently-active step.

In order to achieve the above objects, the present invention provides an improved monitor apparatus for an SFC-type PLC. The monitor apparatus comprises: a reference-active-time memory unit for storing a standard value of an active time of an arbitrary step in an SFC program; a timer for measuring the active time of the arbitrary step; and an anomalous-state monitoring unit which detects an anomalous state through comparison between the active time measured by the timer and the reference value stored in the reference-active-time memory unit.

Since an anomalous state is detected on the basis of the length of an active time of each monitored step, no special monitor program is needed for detection of an anomalous state. Thus, an anomalous state can be detected by use of existing means such as a timer and a memory unit.

Preferably, the monitor apparatus further comprises a display unit for displaying the program in such a manner that a step which has been detected by the anomalous-state monitoring unit to be in an anomalous state is distinguished from other steps. In this case, a cause of an anomalous state can be specified quickly.

Alternatively or additionally, the monitor apparatus comprises an execution monitor unit for storing data indicating whether each step in the SFC program has been executed; and the display unit displays the program in such a manner that a step or steps which have been executed are distinguished from a step or steps which have not yet been executed, on the basis of the data stored in the execution monitor unit. In this case, an execution history of the program can be found easily.

Preferably, when conditions for transition from a certain step to the next step are satisfied, the execution monitor unit brings a corresponding execution-completion flag into a predetermined state to thereby memorize whether the step has been executed. In this case, since no special monitor program for monitoring execution of each step is needed, execution of each step can be monitored with ease by use of existing means such as a memory unit.

The present invention can be applied not only to a PLC which directly executes an SFC program but also to a PLC which converts an SFC program to a ladder program and executes the ladder program. The monitor apparatus of the present invention can be realized by use of a separate-type peripheral apparatus which is connected to the PLC via a cable or the like and which has functions necessary for operation as the monitor apparatus. Alternatively, the monitor apparatus of the present invention can be realized by sole use of a PLC. In this case, necessary functions such as a display function are added to the PLC such that the PLC can operate as the monitor apparatus.

BRIEF DESCRIPTION OF THE DRAWINGS

Various other objects, features and many of the attendant advantages of the present invention will be readily appreciated as the same becomes better understood by reference to the following detailed description of the preferred embodiment when considered in connection with the accompanying drawings, in which:

FIG. 5 is a diagram showing an active-state table used in the embodiment of the present invention;

FIG. 6 is a diagram showing a monitor-step setting table used in the embodiment of the present invention;

FIG. 7 is a diagram showing a reference-active-time table used in the embodiment of the present invention;

FIG. 8 is a diagram showing an anomalous-state monitor table used in the embodiment of the present invention;

FIG. 9 is a diagram showing an execution monitor table used in the embodiment of the present invention;

FIG. 17 is a table showing the status of active flags, execution-completion flags, and anomalous-state flags used in the embodiment of the present invention.

DESCRIPTION OF THE PREFERRED EMBODIMENT

An embodiment of the present invention will be described with reference to the drawings.

Figure 1:
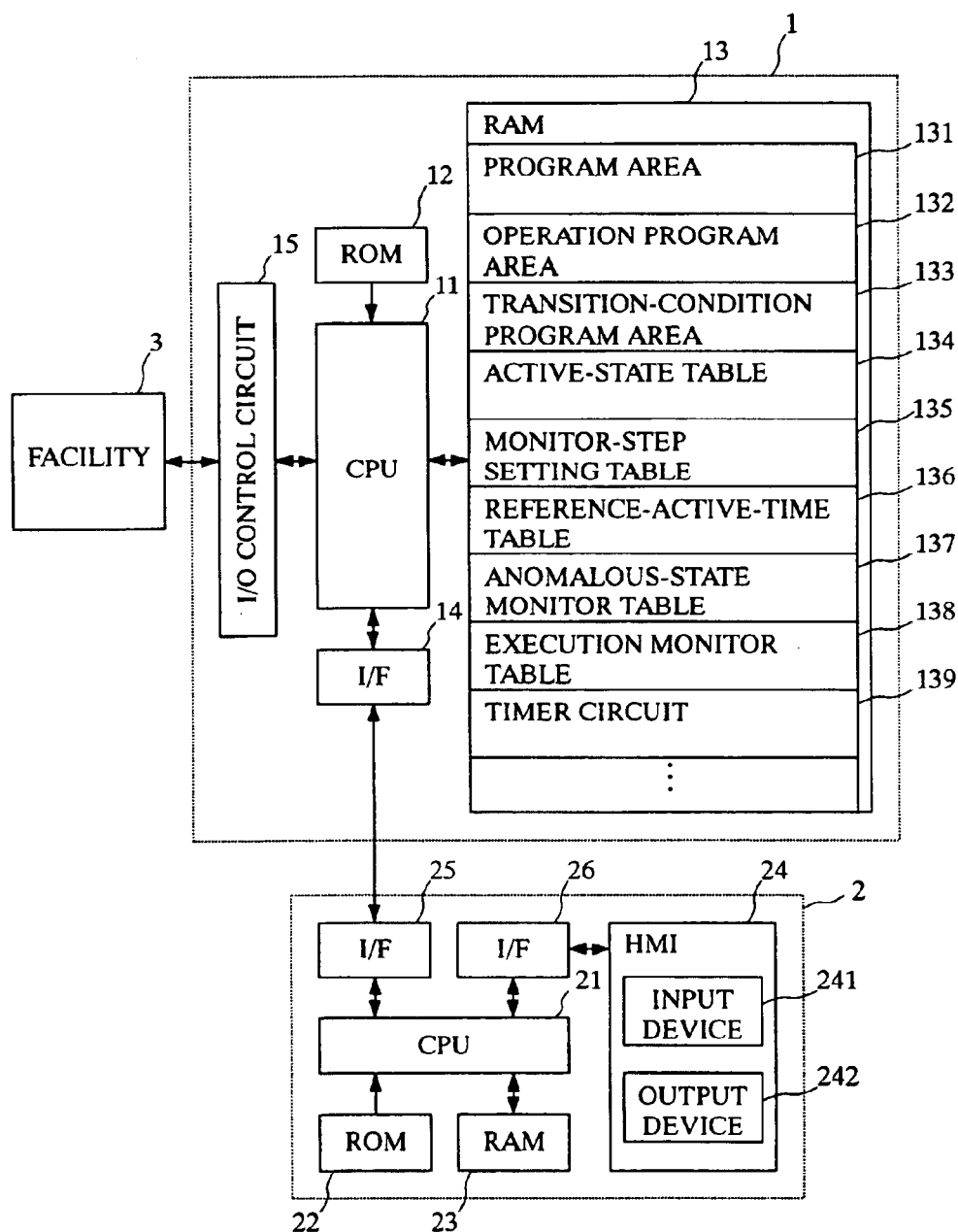
FIG. 1 is a block diagram showing a PLC, a peripheral apparatus, and a facility according to an embodiment of the present invention.

FIG. 1 is a control block diagram showing a PLC 1, a peripheral apparatus 2 connected to the PLC 1, and a facility 3 controlled by the PLC 1.

The PLC 1 includes a CPU 11 serving as a calculation section; ROM 12 storing a system program and other necessary data; RAM 13 having a program area 131 for storing SFC programs, and areas for storing various tables, which will be described later; an interface 14 for exchanging data with the peripheral apparatus 2; and an I/O control circuit 15 for exchanging input and output signals (I/O signals) with the facility 3.

The peripheral apparatus 2 is constituted by a computer, such as a personal computer, and includes a CPU 21 serving as a calculation section; ROM 22 storing a system program and other necessary data; RAM 23 storing various control programs, including a program for display processing, which will be described later; a human-machine-interface (HMI) section 24; and interfaces 25 and 26. The peripheral apparatus 2 is provided with an input device 241 having a function for inputting various data, such as programs, to the PLC 1, and an output device 242 having a function for outputting (displaying) various data of the PLC 1 for monitoring purpose. However, the details of the input and output functions of the peripheral apparatus 2 are not described here, because they do not relate directly to the present invention. In the present embodiment, the peripheral apparatus 2 is provided separately from the PLC 1. However, the PLC 1 may be configured to have functions of the peripheral apparatus 2.

The facility 3 is an object, such as a machine tool, to be controlled by the PLC 1. The facility 3 is controlled by the PLC 1 through exchange of input and output signals (I/O signals) with the PLC 1.

Figure 2:
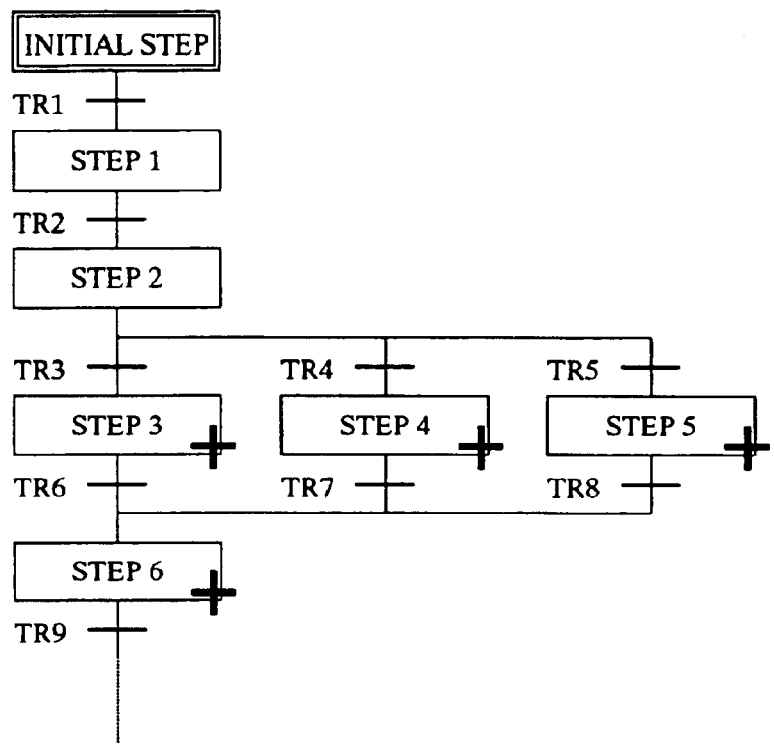
FIG. 2 is a diagram showing an exemplary SFC program.

FIG. 2 shows an exemplary SFC program. In FIG. 2, rectangular blocks labeled INITIAL STEP, STEP 1, etc., respectively represent an initial step and subsequent steps. The initial step (hereinafter referred to as "INITIAL STEP") is enclosed by double lines. TR1 to TR9 each represent a transition. The steps and the transitions are connected as in the case of a flowchart to thereby complete an SFC program. When the PLC 1 is turned on, INITIAL STEP is first executed, and when conditions for transition TR1 are satisfied, the operation proceeds to the next step; i.e., STEP 1. In this exemplary program, STEP 3, STEP 4, and STEP 5 are programmed to be placed in selective branches. When conditions for transition TR3 are satisfied during execution of STEP 2, the operation proceeds to STEP 3; when conditions for transition TR4 are satisfied during execution of STEP 2, the operation proceeds to STEP 4; and when conditions for transition TR5 are satisfied during execution of STEP 2, the operation proceeds to STEP 5.

In FIG. 2, steps marked with + are operation monitor steps. The term "operation monitor" means monitoring a period of time in which a relevant step marked with + is in an active state (hereinafter simply referred to as an "active time"). During a programming phase, a programmer adds a "+" mark to each of steps to be monitored. Thus, the steps marked with + are recognized as operation monitor steps and their active times are monitored.

Figure 3:
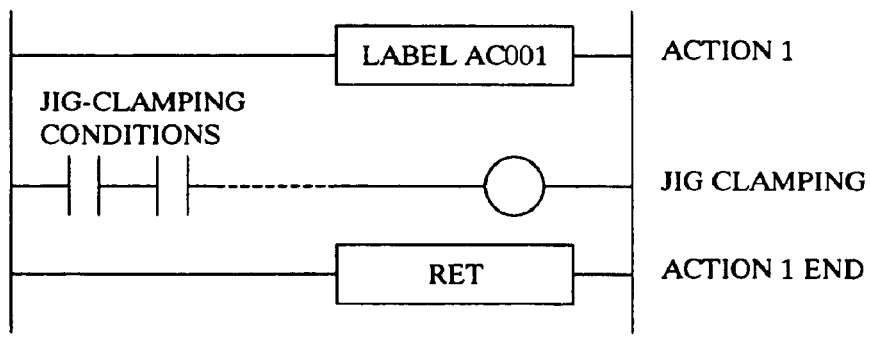
FIG. 3 is a diagram showing an exemplary operation program.

An operation program described by use of, for example, ladder symbols or mnemonic codes is provided for or allotted to each step and is stored in an operation program area 132 of the RAM 13. FIG. 3 shows an example of such an operation program. The operation program shown in FIG. 3 corresponds to STEP 1 and is described in the form of a ladder-type program; i.e., by use of ladder symbols. This operation program is programmed in such a manner that the PLC 1 checks the status of input and output devices in the facility 3 and effects jig clamping operation when conditions for jig clamping are satisfied.

Figure 4:
FIG. 4 is a diagram showing an exemplary transition-condition program.
Figure 10:
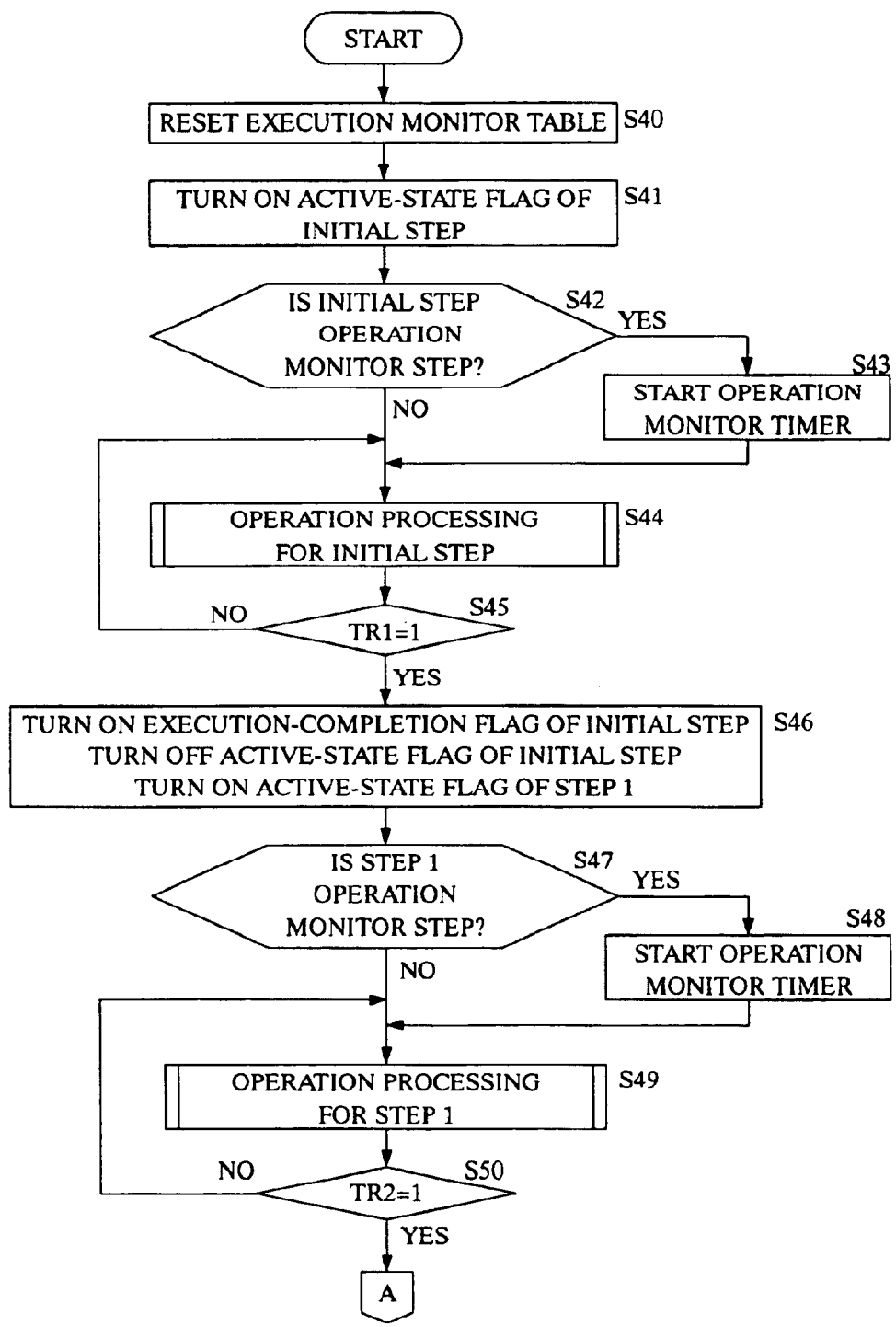
FIGS. 10 to 14 are flowcharts showing the processing for executing an SFC program according to the embodiment of the present invention.
Figure 11:
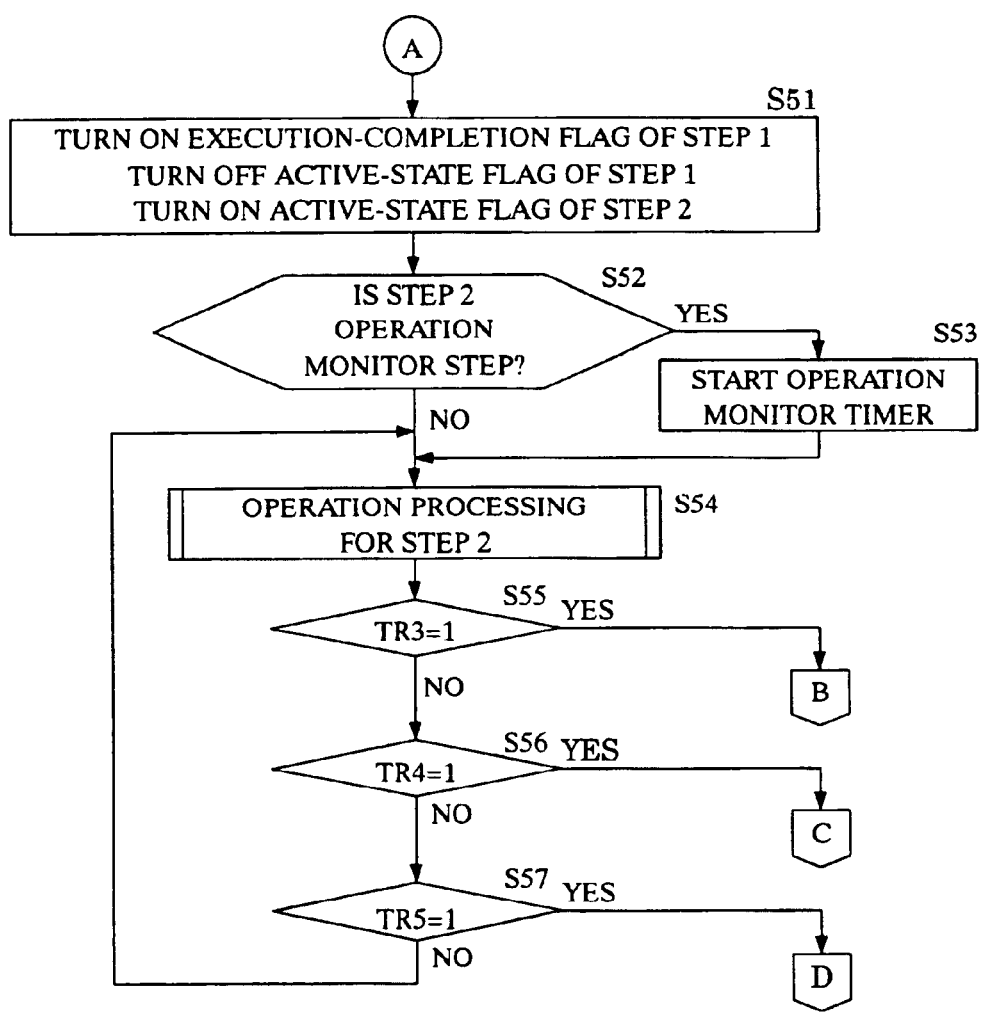
Figure 12:
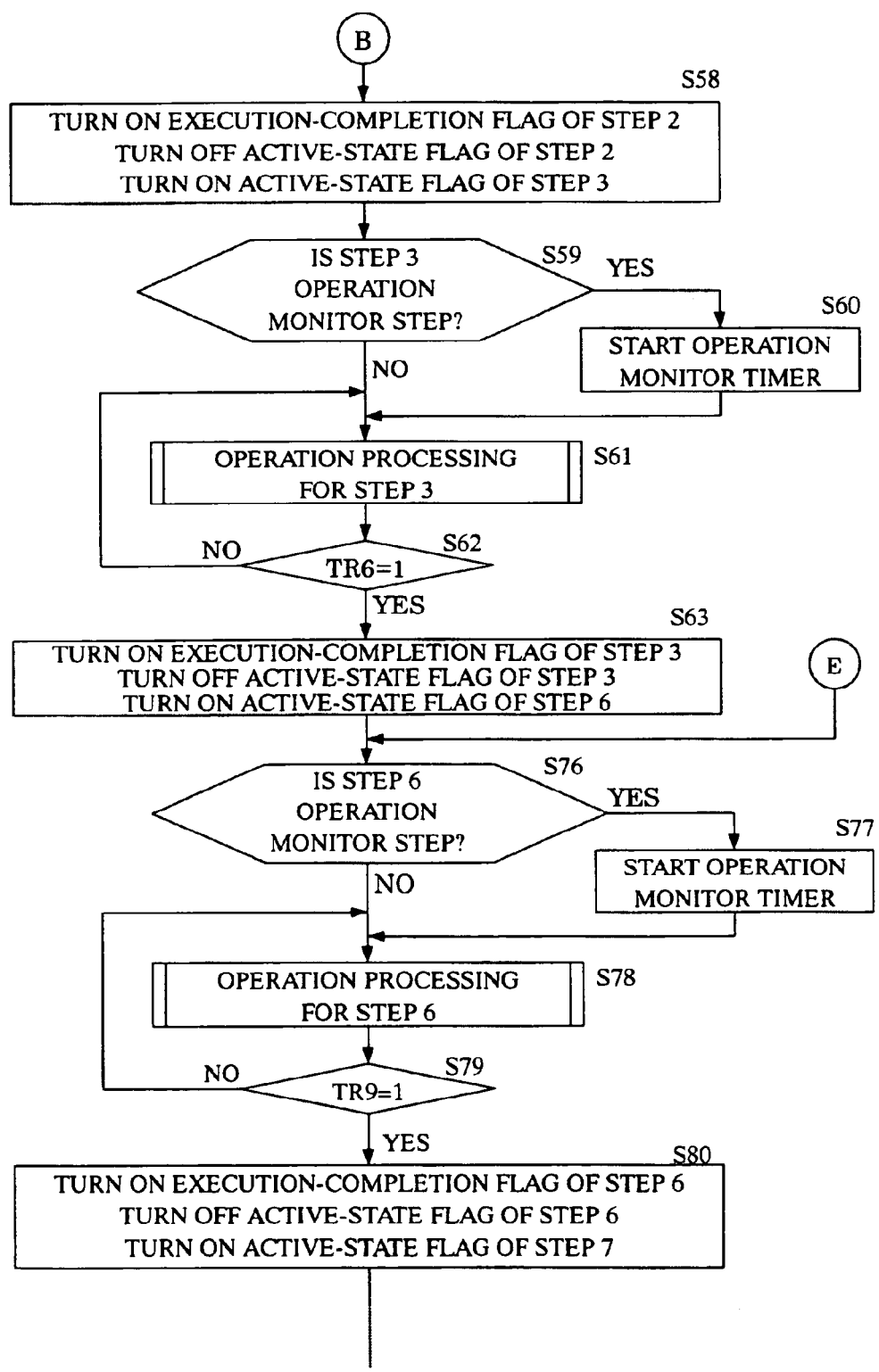
Figure 13:
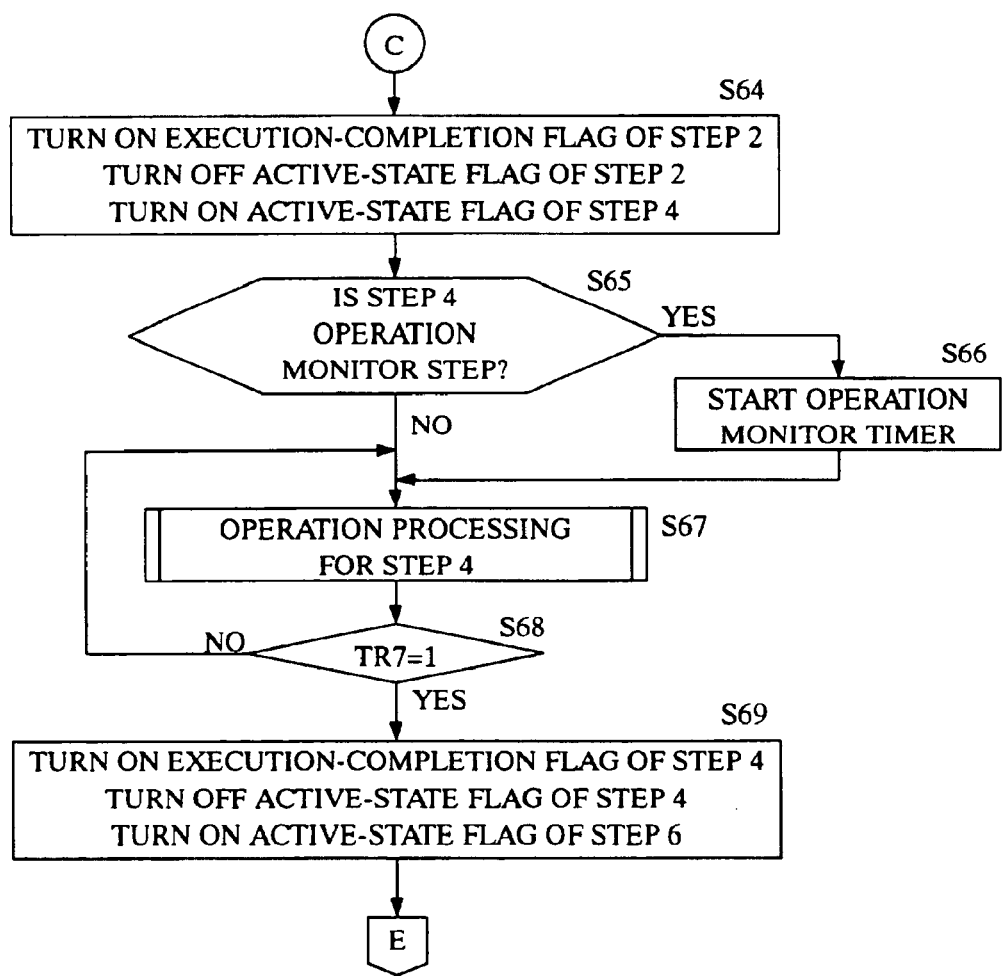
Figure 14:
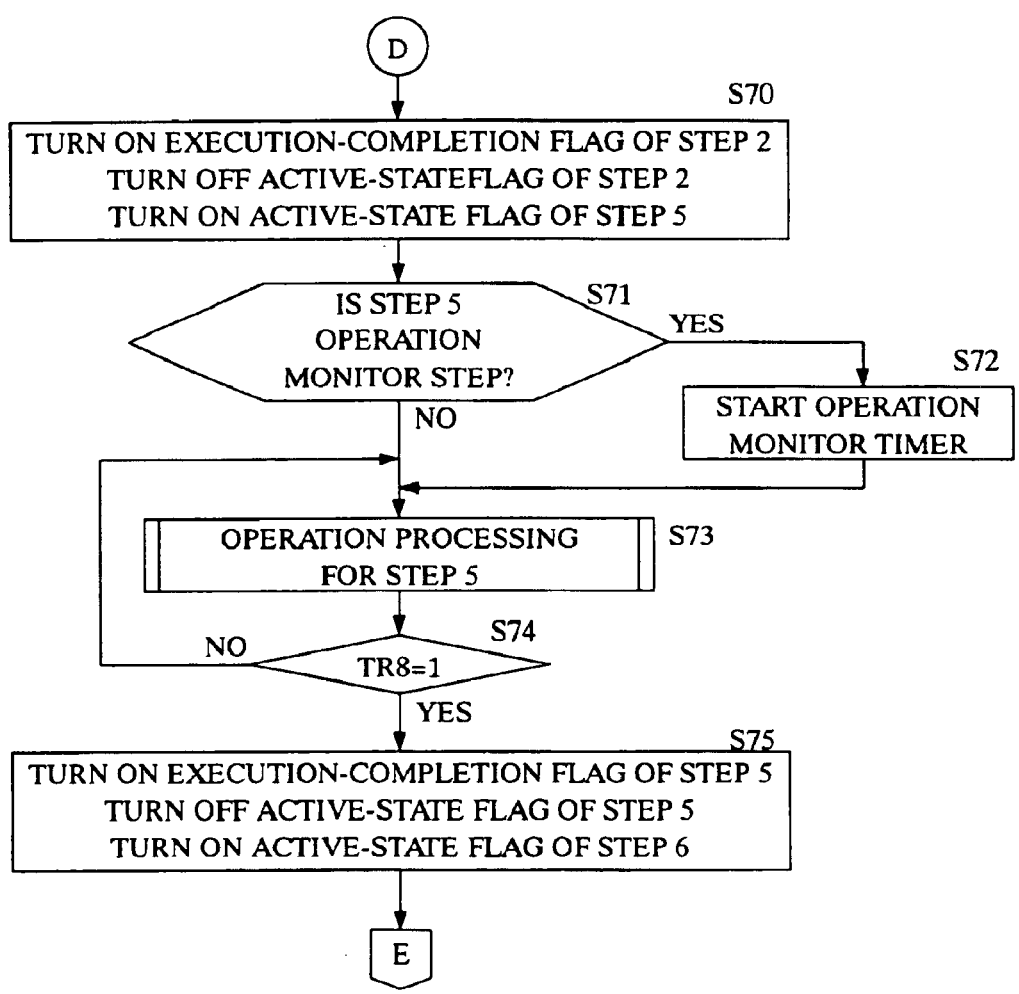

Further, a transition-condition program described by use of, for example, ladder symbols or mnemonic codes is provided for or allotted to each transition and is stored in a transition-condition program area 133 of the RAM 13. FIG. 4 shows an example of such a transition-condition program. The transition-condition program shown in FIG. 4 corresponds to transition TR1 and is described in the form of a ladder-type program; i.e., by use of ladder symbols. This transition-condition program is programmed in such a manner that the PLC 1 checks the status of input and output devices in the facility 3 and turns TR1 ON (TR1="1") when the corresponding transition conditions are satisfied.

Next, various types of tables stored in the RAM 13 will be described. When a plurality of programs are executed in parallel, the tables are provided for each of the programs.

FIG. 5 shows an active-state table 134 stored in the RAM 13. The active-state table 134 stores therein an active flag corresponding to each step and representing whether the step is in an active state or a non-active state. When the value of a certain active flag is "1," it means that the corresponding step is in the active state, and when the value of the active flag is "0," it means that the step is in the non-active state. An active flag of step(n) is set to "1" when conditions for transition TR(n) for moving from the preceding step(n−1) to the step(n) are satisfied, and is set to "0" when conditions for transition TR(n+1) for moving from the step(n) to the next step(n+1) are satisfied. Therefore, basically, one of the active flags corresponding to the steps is "1," and the active flags of remaining steps are "0." However, in the case of a program containing a parallel operation, active flags of a plurality of steps can assume "1" simultaneously.

FIG. 6 shows a monitor-step setting table 135 stored in the RAM 13. The monitor-step setting table 135 stores therein a monitor flag corresponding to each step and representing whether the step is a step whose operation is to be monitored (hereinafter referred to as an "operation monitor step"). When the value of a certain monitor flag is "1," it means that the corresponding step is an operation monitor step, and when the value of the monitor flag is "0," the step is not an operation monitor step. FIG. 7 shows a reference-active-time table 136 stored in the RAM 13. The reference-active-time table 136 stores therein a reference active time for each of the operation monitor steps, which reference active time is used as a reference in the monitoring thereof. Further, FIG. 8 shows an anomalous-state monitor table 137 stored in the RAM 13. The anomalous-state monitor table 137 stores therein presence or absence of an anomalous state for each of the operation monitor steps. When a certain operation monitor step comes into an anomalous state, a corresponding anomalous-state flag is set to "1."

When a programmer inputs a program as shown in FIG. 2, the programmer adds the "+" mark to each of steps to be monitored; i.e., operation monitor steps. As a result, the monitor flags of these steps stored in the monitor-step setting table 135 are set to "1." Further, in response to the addition of the "+" mark to each operation monitor step, the programmer is requested to input a reference active time. When the programmer inputs a reference active time in consideration of a standard operation time of the operation monitor step, the reference active time is stored in the reference-active-time table 136. The input of the reference active time can be rendered more efficient when a reference time generally applicable to all the steps is stored as a default value, and the default value of each step is changed if necessary.

The active time of each operation monitor step, which has been set in the above-described manner, is measured by use of a timer circuit 139 stored in the RAM 36. The active time measured by the timer circuit 139 is compared with a corresponding reference active time stored in the reference-active-time table 136. When the active time measured by the timer circuit 139 exceeds the corresponding reference active time, a corresponding anomalous-state flag in the anomalous-state monitor table 137 is set to "1."

FIG. 9 shows an execution monitor table stored in a storage area 138 of the RAM 13. The execution monitor table stores therein an execution-completion flag corresponding to each step and representing whether or not the step has been executed. When the value of a certain execution-completion flag is "1," it means that the corresponding step has been executed, and when the value of the execution-completion flag is "0," it means that the step has not been executed yet. As in the case of active flags, an execution-completion flag of step(n) is set to "1" when conditions for transition TR(n+1) for moving the step(n) to the next step(n+1) are satisfied.

Next, the operation of the CPU 11 will be described with reference to the flowcharts shown in FIGS. 10 to 15.

First, a programmer creates and inputs an SFC program by use of the input function of the peripheral apparatus 2. During this phase, the programmer adds the "+" mark to each of steps to be monitored; i.e., operation monitor steps, whereby the monitor flags of these steps stored in the monitor-step setting table 135 are set to "1." Further, when the operator inputs a reference active time for each operation monitor step, the reference active time is stored in the reference-active-time table 136. The thus-created SFC program is transferred to the program area 131 of the RAM 13. Moreover, operation programs corresponding to the steps used in the program and transition-condition programs corresponding to the transitions used in the program are transferred to the operation program area 132 and the transition-condition program area 133, respectively.

When the PLC 1 is started in such a state, the CPU 11 first resets the execution monitor table 138; i.e., sets all the execution-completion flags to "0" in S40. Subsequently, in S41, the CPU 11 turns on the active-state flag of INITIAL STEP; i.e., sets a corresponding active flag in the active-state table 134 to "1." In S42, the CPU 11 judges whether INITIAL STEP is an operation monitor step; i.e., whether the value of a corresponding flag in the monitor-step setting table 135 is "1." When the result of the judgment is YES, the CPU 11 proceeds to S44 via S43, and when the result of the judgment is NO, the CPU 11 proceeds directly to S44. In S43, the CPU 11 starts the timer circuit 139 to thereby measure the active time of INITIAL STEP. In S44, the CPU 11 performs operation processing for INITIAL STEP. In S45, the CPU 11 judges whether the value of transition TR1 is "1," which transition TR1 is set to "1" when conditions for transition from INITIAL STEP to STEP 1 are satisfied. When the result of the judgment is NO, the CPU 11 returns to S44 to thereby repeat the operation processing. When the result of the judgment is YES, the CPU 11 proceeds S46 to start the next step. Since INITIAL STEP has been executed already, in S46, the CPU 11 turns on an execution-completion flag in the execution monitor table 138 corresponding to INITIAL STEP, so that the execution-completion flag is set to "1," and turns off an active flag in the active-state table 134 corresponding to INITIAL STEP, so that the active flag is set to "0," because INITIAL STEP comes into a non-active state. Further, the CPU 11 turns on an active flag in the active-state table 134 corresponding to the next step; i.e., STEP 1, in order to activate STEP 1.

INITIAL STEP is a step which is executed first of all when the PLC 1 is started.

Next, the CPU 11 proceeds to S47 and performs processing for STEP 1 in S47 to S51 in a manner similar to that for INITIAL STEP performed in S42 to S46. That is, while referring to the monitor-step setting table 135, the CPU 11 judges whether STEP 1 is an operation monitor step. When STEP 1 is an operation monitor step, in S48, the CPU 11 starts the timer circuit 139, and in S49, performs operation processing for STEP 1. When transition TR2 is judged to be "1," the CPU 11 proceeds to S51 to thereby turn on an execution-completion flag in the execution monitor table 138 corresponding to STEP 1, turn off an active flag in the active-state table 134 corresponding to STEP 1, and turn on an active flag in the active-state table 134 corresponding to STEP 2.

Subsequently, the CPU 11 proceeds to S52 and performs processing for STEP 2 in S52 to S54 in a manner similar to that for INITIAL STEP performed in S42 to S44 or that for STEP 1 performed in S47 to S49. Since STEP 3 to STEP 5 to be performed subsequent to STEP 2 are located on selective branches, different from the case of S45 in relation to INITIAL STEP or the case of S50 in relation to STEP 1, the CPU 11 performs branching processing in S55 to S57. Specifically, in S55 to S57, the CPU 11 judges which of transition conditions for transition TR3, transition conditions for transition TR4, and transition conditions for transition TR5 are satisfied. When the CPU 11 judges in S55 that transition conditions for transition TR3 are satisfied, the CPU 11 proceeds to S58; when the CPU 11 judges in S56 that transition conditions for transition TR4 are satisfied, the CPU 11 proceeds to S64; and when the CPU 11 judges in S57 that transition conditions for transition TR5 are satisfied, the CPU 11 proceeds to S70.

In the similar manner as in the above-described steps, the CPU 11 performs processing for STEP 3 in S58 to S63 when having proceeded to S58; performs processing for STEP 4 in S64 to S69 when having proceeded to S64; and performs processing for STEP 5 in S70 to S75 when having proceeded to S70.

After completion of processing in S63, 569, or S75, the CPU 11 performs processing for STEP 6 in S76 to S78.

Figure 15:
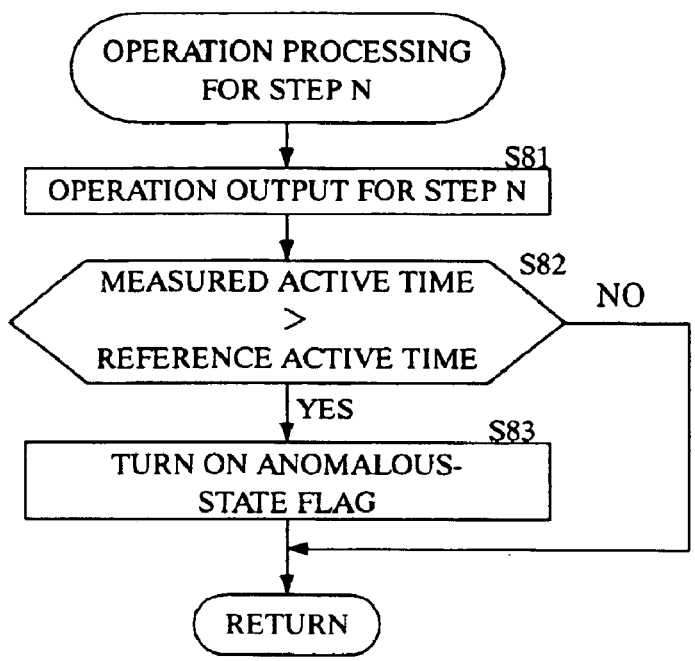
FIG. 15 is a flowchart showing the details of the operation processing shown in FIGS. 10 to 14.

FIG. 15 shows a sub-routine for operation processing performed in each of S44, S49, S54, S61, S67, S73, and S78. First, in S81, the CPU 11 performs operation output processing for each step. That is, an operation program as shown in FIG. 3 is called and executed. Subsequently, in S82, the CPU 11 compares the active time of the relevant step measured by use of the operation monitor timer with a corresponding reference active time stored in the reference-active-time table 136. When the measured active time is greater than the reference active time, the CPU 11 proceeds to S83 and turns on a corresponding abnormal-state flag in the anomalous-state monitor table 137. When the measured active time is not greater than the reference active time, the CPU 11 returns to the main routine without performance of any processing. When the step is not an operation monitor step (i.e., when the value of a corresponding monitor flag in the monitor-step setting table 135 is "0"), the operation monitor timer has not been started, and therefore, the result of the judgment in S82 become NO, so that the CPU 11 returns to the main routine without performance of any processing.

When the facility 3 operates properly, the processing proceeds in the above-described manner. Here, it is assumed that INITIAL STEP, STEP 1, and STEP 2 are executed sequentially; transition conditions for transition TR4 are then satisfied, resulting in performance of STEP 4; transition conditions for transition TR7 are then satisfied, resulting in start of STEP 6; and a failure occurs in STEP 6, so that transition conditions for transition TR9 are not satisfied, and therefore, the processing does not proceed to S80.

Since STEP 6 is an operation monitor step, when the above-described state continues, the count value of the operation monitor timer increases and exceeds 5.0 sec., which is the reference active time of STEP 6. As a result, the result of the judgment in S82 becomes YES, and in S83, an anomalous-state flag in the anomalous-state monitor table 137 corresponding to STEP 6 is turned on. This triggers the PLC 1 to send a signal to the peripheral apparatus 2, so that the SFC program is displayed on the peripheral apparatus 2.

Figure 16:
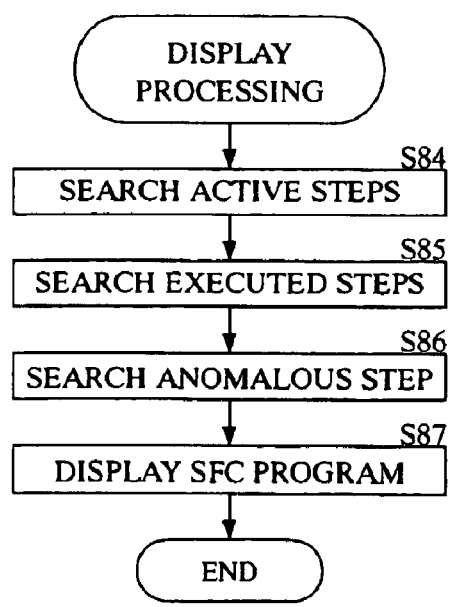
FIG. 16 is a flowchart showing display processing according to the embodiment of the present invention.

FIG. 16 is a flowchart showing processing for the display. In S84, the CPU 11 searches the active-state table 134 so as to find steps whose active flags are "1." In S85, the CPU 11 searches the execution monitor table 138 so as to find steps whose execution-completion flags are "1." In S86, the CPU 11 searches the anomalous-state monitor table 137 so as to find a step whose anomalous-state flags is "1." On the basis of the search results obtained in S84 to S86, the SFC program is displayed on a display screen of the output device 242.

Figure 18:
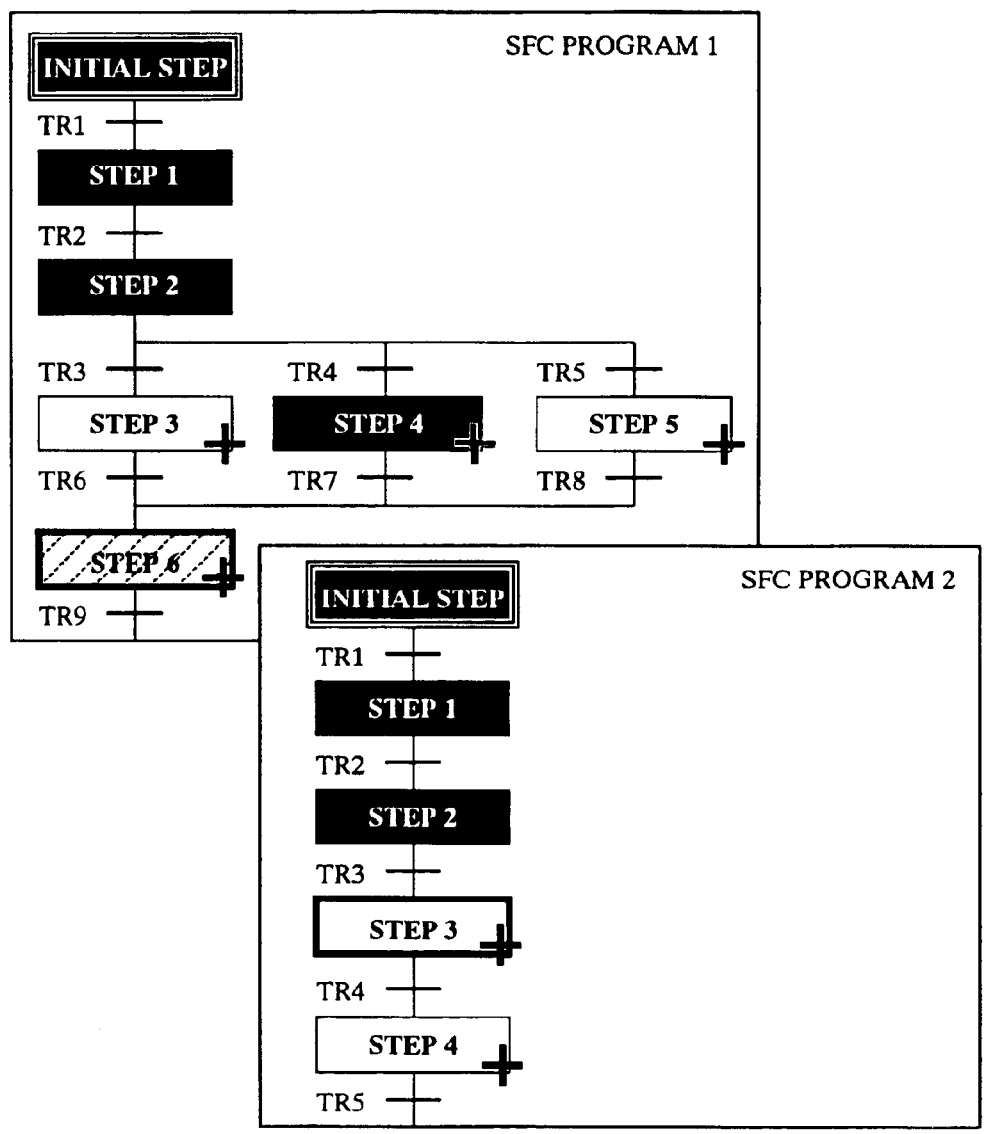
FIG. 18 is a diagram showing a display screen on which SFC programs are displayed.

In the above-described state, the respective flags of the steps assume values as shown in FIG. 17. That is, as to active flags, only the active flag of STEP 6 is in an "ON" state or assumes "1"; as to execution-completion flags, each of the execution-completion flags of INITIAL STEP, STEP 1, STEP 2, and STEP 4 is in an "ON" state or assumes "1"; and as to anomalous-state flags, only the active flag of STEP 6 is in an "ON" state or assumes "1." In S87, the CPU 21 displays the SFC program in such a manner that steps each having an ON-state flag are distinguished from the remaining steps. FIG. 18 shows an display screen on which the SFC program is displayed. In the display screen shown in FIG. 18, in addition to the above-described SFC program (SFC PROGRAM 1), another SFC program (SFC PROGRAM 2) executed in parallel with the above-described SFC program (SFC PROGRAM 1) is displayed. In the display screen, an active step (STEP 6) is shown by use of a thick-line frame; and executed steps (INITIAL STEP, STEP 1, STEP 2, and STEP 4) are shown by use of solid black rectangles; and an anomalous step (STEP 6) is indicated by means of broken-line hatching. An operator seeks the cause of the anomalous state on the basis of the displayed SFC. Coloring, blinking, or any other suitable display method may be employed in order to allow the operator to grasp the statuses of the respective steps.

According to the above-described embodiment, an anomalous-state monitor is performed through comparison between a measured active time and a corresponding reference active time. Even when an anomalous state occurs during parallel execution of a plurality of programs, it is possible to find an anomalous step, in addition to active steps. That is, in the display screen shown in FIG. 18, STEP 6 of SFC PROGRAM 1 and STEP 3 of SFC PROGRAM 2 are both active. However, since STEP 6 of SFC PROGRAM 1 which has caused the anomalous state is displayed in such a manner as to be distinguished from STEP 3 of SFC PROGRAM 2, a step which has caused the anomalous state can be specified quickly.

Further, according to the above-described embodiment, since executed steps are memorized through monitoring, even in the case of a program having selective branches, a history or path up to a step which has caused an anomalous state can be found. That is, in the display screen shown in FIG. 18, STEP 4, which has already been executed, is displayed in such a manner as to be distinguished from STEP 3 and STEP 5, which have not yet been executed. Therefore, it is possible to find whether an anomalous state of STEP 6 occurred after execution of STEP 3 or after execution of STEP 4, thereby enabling quick specification of a cause of the anomalous state.

Further, when the facility stops due to occurrence of an anomalous state, the operation steps sometimes must be followed backward through an MDI (Manual Data Input) operation. When such a backward operation is performed with reference to the execution history, the backward operation can be performed precisely and easily. In addition, the monitor apparatus of the present invention is expected to provide remarkable effects not only in specifying a cause of an anomalous state occurred during an ordinary operation, but also in many other situations. For example, the monitor apparatus of the present invention can find a location involving a failure during adjustment or trial operation of the facility 3, or during debugging of a control program.

Obviously, numerous modifications and variations of the present invention are possible in light of the above teachings. It is therefore to be understood that within the scope of the appended claims, the present invention may be practiced otherwise than as specifically described herein.

What is claimed is:

1. A monitor apparatus for a sequential-function-chart-type programmable controller, comprising:

a reference-active-time memory unit configured to store a standard value of an active time of an arbitrary step in a sequential-function-chart program;

a timer configured to measure actual active time of the arbitrary step;

an anomalous-state monitoring unit configured to detect an anomalous state of the arbitrary step through a comparison between the active time measured by the timer and the standard value stored in the reference-active-time memory unit;

a display unit configured to display the sequential-function-chart program steps in such a manner that a step which has been detected by the anomalous-state monitoring unit to be in an anomalous state is distinguished from other displayed steps; and an execution monitor unit configured to store data indicating whether or not each step in the sequential-function-chart program has been executed, wherein the display unit is further configured to display the sequential-function-chart program steps in such a manner that any step or steps which have been executed are distinguished from any step or steps which have not yet been executed, on the basis of the data stored in the execution monitor unit so as to indicate a history or path up to the step detected to be in an anomalous state, wherein the history or path up to the step detected to be in an anomalous state is reset by eliminating data indicating executed steps from the data stored in the execution monitor unit during an initial step of the sequential-function-chart program.

2. A monitor apparatus for a sequential-function-chart-type programmable controller according to claim 1, wherein when conditions for transition from a certain step to the next step are satisfied, the execution monitor unit is configured to bring a corresponding execution-completion flag into a predetermined state to thereby store data indicating that the certain step has been executed.

3. A monitor apparatus for a sequential-function-chart-type programmable controller, comprising:

a reference-active-time memory unit configured to store a standard value of an active time of an arbitrary step in a sequential-function-chart program;

a timer configured to measure actual active time of the arbitrary step;

an anomalous-state monitoring unit configured to detect an anomalous state of the arbitrary step through a comparison between the active time measured by the timer and the standard value stored in the reference-active-time memory unit;

an execution monitor unit configured to store data indicating whether or not each step in the sequential-function-chart program has been executed; and a display unit configured to display the program in such a manner that a step detected by the anomalous-state monitoring unit to be in an anomalous state, a step or steps which have been executed, and a step or steps which have not yet been executed are distinguished from one another so as to indicate a history or path up to the step detected to be in an anomalous state, wherein the history or path up to the step detected to be in an anomalous state is reset by eliminating all data indicating executed steps from the data stored in the execution monitor unit during an initial step of the sequential-function-chart program.

4. A monitor apparatus for a sequential-function-chart-type programmable controller according to claim 3, wherein when conditions for transition from a certain step to the next step are satisfied, the execution monitor unit is configured to bring a corresponding execution-completion flag into a predetermined state to thereby store data indicating that the certain step has been executed.

* * * * *